United States Patent Office 2,734,888
Patented Feb. 14, 1956

2,734,888

DYE RECEPTIVE ACRYLONITRILE POLYMERIZATION PRODUCTS

Gaetano F. D'Alelio, Pittsburgh, Pa., assignor to Koppers Company, Inc., a corporation of Delaware No Drawing. Application August 31, 1951,
Serial No. 244,688

30 Claims. (Cl. 260—45.5)

This invention relates to processes for improving the dye susceptibility of acrylonitrile polymers and for imparting affinity for acids thereto, and also relates to the products thus obtained.

Acrylonitrile polymers have become of commercial significance in recent years for the preparation of shaped articles such as films, fibers, foils, tubes, etc. Some of these polymers have a fibrous character and are capable of being cold-drawn to produce structures molecularly oriented along the fiber axis, cold-drawing being defined as the stretching of polymeric material at a temperature below the melting point of the material to give a molecularly oriented structure. For the most part these acrylonitrile polymers are difficult to dye and special dyes or special dyeing techniques or special polymer compositions have to be resorted to in order to obtain satisfactory dyeing.

The resistance of acrylonitrile polymers to dyes of all types has presented serious dyeing problems especially in the development of synthetic fibers of these polymers. In fact, in order to dye polyacrylonitrile, one commercial process has resorted to the use of high pressures with water solutions or organic dispersions of dyes. It has been proposed also that improvements in dye susceptibility can be obtained by copolymerizing acrylonitrile with a small amount of vinyl pyridine. In this way susceptibility to acidic dyes is imparted to the acrylonitrile polymer. In a like manner it has also been proposed to impart susceptibility to basic dyes by copolymerizing with the acrylonitrile a small amount of a polymerizable ethylenic acid such as itaconic acid or acrylic acid.

According to the present invention an improved way of imparting dye susceptibility to acrylonitrile polymers is first to prepare a polymer composition from acrylonitrile and a polymerizable ethylenic acid, such as, acrylic, methacrylic, cyanoacrylic, maleic, fumaric, citraconic, mesaconic and itaconic acids and the corresponding acid anhydrides which are available, and to amidate or esterify the acid groups of the polymerized ethylenic acid with an organic compound having a basic tertiary nitrogen group and a group which is capable of forming an ester or an amide with the ethylenic acid units of the copolymer. Any basic nitrogenous compound containing a tertiary nitrogen group and a group having a replaceable hydrogen (replaceable by an acyl group) selected from the class consisting of hydroxyl and amino groups can be utilized for this purpose. When the polymer compositions of acrylonitrile and of polymerizable ethylenic acids are heated or otherwise treated with such after treating-agents according to the usual and known procedures for esterifying and amidating, the amide or ester-forming groups react with the acid groups of the polymer composition to form amides or esters, as the case may be, leaving the basic tertiary nitrogen group available for subsequent union with acidic groups of acid dyes.

The after-treatment may be effected in a variety of ways. Thus the basic nitrogenous compound and the polymer composition may be dissolved in a mutual solvent or the basic nitrogenous reagent may be dissolved in a solvent which is a non-solvent for the copolymer. The latter method is particularly desirable in treating shaped articles of the polymer composition. Thus filaments or films or other shaped articles of the polymer compositions may be treated with a solution of the basic nitrogenous reagent in a solvent which is a non-solvent for the polymerization product and thereby made susceptible to acid dyes.

The amidation or esterification is effected by heating the solution under reflux or under the autogenous pressure of the solution as required to effect the desired degree of amidation or esterification. If desired, any of the well known dehydration catalysts, such as sulfuric acid, aryl sulfonic acids and hydrochloric acid, may be used to accelerate the reaction. Alternatively the polymer composition can be refluxed with sulfonyl chloride to convert the acid groups to acid chloride groups prior to the amidation or esterification. In such cases, as well also where a polymerizable ethylenic dibasic acid is used in the form of its inner anhydride, the amidation or esterification can ordinarily be carried out at ordinary temperatures up to the reflux temperature of the solution. By these and various other methods of effecting amidation and esterification reactions, the acid groups of the polymer compositions can be amidated or esterified with amino or hydroxy tertiary nitrogen bases to improve the affinity of the polymer compositions to acid groups. Since in the amidation or esterification only part of the available acid groups are amidated or esterified, there will always be some acid group present so that the treated polymer composition will also show affinity for basic compounds. Advantage can be taken of this to provide a polymer composition which has good dye susceptibility to both acid and basic dyes by so conducting the amidation or esterification that advantageously approximately 50 percent of the available acid groups are amidated or esterified. Generally it is advantageous for effective dye susceptibility that the weight proportion of the amide or ester portion of the polymers represent at least about 0.1 percent of the polymer, advantageously 0.1 to 5 percent or even 0.1 to 15 percent.

The basic nitrogenous reagents used in the after-treatment may be aliphatic, alicyclic, aromatic, or heterocyclic nitrogenous bases. Any such tertiary nitrogen base having the necessary amide-forming amino group or ester-forming hydroxyl group may be utilized to incorporate basic groups into polymer compositions obtained from acrylonitrile and polymerizable ethylenic acids. In general, however, it is not desirable to utilize strongly basic compounds, such as are common in the aliphatic and alicyclic series, because such strong bases are likely to impart undesirable aging or discoloring characteristics of the polymer composition. It is generally advantageous that such compounds contain not more than one amide-forming or ester-forming group in order to minimize crosslinking. They may, however, contain any number of basic tertiary nitrogen groups and, where crosslinking is not objectionable, may contain more than one amide-forming or ester-forming group or may contain both amide and ester-forming groups. While the compounds described above are considered as coming within the scope of the invention, particular compounds which are especially advantageous in the practice of the invention are amino and hydroxy pyridines and quinolines and their chloro, bromo, alkyl and aryl derivatives as well as the corresponding hydrogenated derivatives such as piperidine in which the hydrogen on the ring nitrogen is replaced by an alkyl or other group to give a tertiary base; the amino and hydroxy pyrimidines and quinazolines and their chloro, bromo, alkyl and aryl derivatives as well as the corresponding hydrogenated derivatives which contain a basic tertiary nitrogen group; guanazole and its alkyl and aryl derivatives; and hydroxy- and amino-N,N-dialkyl-anilines and their chloro, bromo, alkyl and aryl derivatives. Suitable compounds include para-amino-N,N-dimethylaniline, para-hydroxy-N,N-dimethylaniline, beta-aminopyridine, 8-hydroxyquinoline, 4-hydroxypyrimidine, 4-aminopyrimidine, 4-amino-2,6-dimethylpyrimidine, guanazole, phenyl guanazole, N-methylpiperazine, hydroxy N-methylmorpholine, and amino-N-methyl-morpholine.

For the most part, the basic nitrogenous compounds which are most effective for after-treating the polymer compositions obtained from acrylonitrile and polymerizable ethylenic acids are those which have their tertiary nitrogen atom attached to a double bonded carbon atom of an unsaturated ring structure, as for example, in the structures

or

Such structures are commonly characterized in that the tertiary nitrogen atom is subject to being or is polarized by the combined effect of tautometric and inductive mechanisms. See Remick, Electronic Interpretations of Organic Chemistry, 1st ed., p. 62 et seq. These structures are found in such nitrogenous bases as the pyridines, quinolines, pyrimidines, quinazolines, guanazoles and dialkyl-anilines as may be seen from the following structures wherein R is hydrogen or a hydrocarbon group.

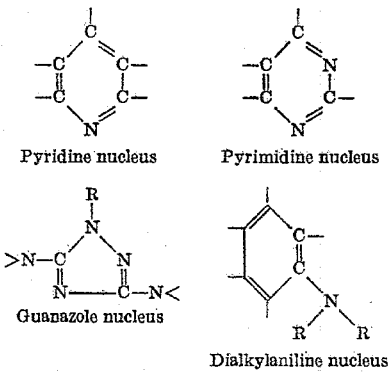

Pyridine nucleus    Pyrimidine nucleus

Guanazole nucleus

Dialkylaniline nucleus

In all these cases, one and only one valence of the tertiary nitrogen atom is satisfied by a ring carbon atom which is doubly bonded to another ring atom. It will be observed that two such groups are found in the pyrimidine nucleus and two also in the guanazole nucleus. It is believed that these groups contribute to the stability and degree of basicity desirable in the after-treating agents of this invention. In any event basic nitrogenous compounds which contain such groups in addition to the necessary amide-forming or ester-forming groups yield superior after-treated products.

In accordance with a preferred form of the invention the after-treating agent may be an amino or hydroxy pyridine having the formula PXH in which X is oxygen or an imino or alkyl-imino group, —NR—, and P is a pyridine nucleus, R is hydrogen or the methyl, ethyl, isopropyl, n-butyl, sec-butyl, amyl, hexyl, decyl, or like alkyl group, advantageously containing less than four carbon atoms. The pyridine nucleus may be substituted or unsubstituted. If substituted, it is preferred that the substituents be a hydrocarbon group or groups containing not more than a total of 5 carbon atoms as in the case of the monoethyl pyridines, the dimethyl pyridines, the diethyl pyridines, the methyl ethyl pyridines, isoquinoline, quinoline, and quinaldine.

In accordance with another preferred form of the invention the radical P in the above formula may be a pyrimidine nucleus. The pyrimidine nucleus may be substituted or unsubstituted as in the case of 4-amino-pyrimidine, 4-hydroxypyrimidine, 4-amino-2,6-dimethyl-pyrimidine, 4-amino-2,6-diethyl-5-methyl-pyrimidine and like amino and hydroxy pyrimidines. Other suitable pyrimidines and methods for their manufacture are given by Larchar, U. S. Patent No. 2,540,826 and Brown, J. Soc. Chem. Ind. 69, 353+ (1950). If substituted it is preferred that the substituents shall be alkyl groups containing a total of not more than 5 carbon atoms.

In accordance with another preferred form of the invention the after-treating agent may be an amino or hydroxy aromatic tertiary amine of the formula

HX—A—NR'₂ in which X is oxygen or an imino or alkylimino group, —NR—; the radical —NR'₂ is a dialkylamino group; and A is an aryl nucleus such as benzene or naphthalene. The radical R' and the radical R when not hydrogen are methyl, ethyl, isopropyl, n-butyl, sec-butyl, amyl, hexyl, decyl or like alkyl groups. Advantageously the alkyl groups do not contain more than four carbon atoms and the aryl nucleus is unsubstituted except for hydrocarbon substituents containing a total of not more than 5 carbon atoms.

In accordance with still another preferred form of the invention the after-treating agent may be a diamino-1,2,4-triazine such as guanazole and may be represented by the formula R₂N—ZR—NR₂ in which at least one R is hydrogen and the remaining R's are hydrogen or alkyl, aryl, aralkyl, alkaryl, or cycloalpihatic groups and Z is the 1,2,4-triazole nucleus

obtained by removing the nuclear substituents from guanazole. Guanazole is readily prepared by refluxing an aqueous solution of dicyandiamide and a hydrazine salt, such as, the hydrochloride or sulfate and then neutralizing the acid. Substituted guanazoles may be prepared by using substituted hydrazines, such as phenyl-, tolyl-, benzyl-, cyclohexyl-, or methyl-hydrazine instead of hydrazine and/or substituting appropriate alkyl, aryl, aralkyl, alkaryl, and cycloalkyl biguanides for the dicyandiamide. Thus one or more of the N-hydrogens of guanazole may be replaced by such groups as methyl, ethyl, isopropyl, n-butyl, sec-butyl, amyl, hexyl, decyl, phenyl, tolyl, xylyl, benzyl, phenethyl, naphthyl, cyclohexyl, cyclopentyl, and like alkyl, aryl, aralkyl, alkaryl, and cycloaliphatic groups.

The polymerizable ethylenic acids utilized in preparing the polymer compositions to be treated according to the processes of this invention include acrylic acid, methacrylic acid, cyanoacrylic acid, maleic acid, fumaric acid, citraconic acid, mesaconic acid and itaconic acid as well as the anhydrides of maleic, citraconic, and itaconic acids. Any of these acids (the term "acid" is herein intended to include the corresponding anhydride where available as well as the acid) may be copolymerized with acrylonitrile to give useful polymer compositions which when after-treated in accordance with the processes of this invention will have improved affinity for acids. In addition to the acids specifically mentioned above other polymerizable ethylenic acids may also be suitable for the practice of this invention and are considered as falling within the scope of the invention.

The inner anhydrides of difunctional ethylenic acids, such as, maleic, citranonic and itaconic anhydrides are, however, uniquely different from the corresponding free acids or the other free acids because the polymer compositions prepared from these anhydrides react much more easily with the hydroxy or amino tertiary nitrogenous bases than the free acids.

The use of itaconic anhydride in the practice of this invention is particularly advantageous since it readily forms homopolymers and heteropolymers by virtue of its $CH_2=C<$ group and also gives polymers having anhydride groups which are easily reacted to give esters and amides.

The amount of polymerizable ethylenic acid needed in preparing these polymer compositions in order that satisfactory dye susceptibility may be obtained by the processes of this invention may vary over a considerable range depending upon the nature of the polymer composition and the nature of the hydroxy or amino tertiary nitrogenous base utilized in treating the polymer composition to impart dye susceptibility thereto and the extent to which the treatment is carried out. Although even smaller amounts are somewhat effective, the improvement in susceptibility of the polymer compositions to acid dyes which can be obtained by the processes of this invention becomes particularly noticeable when the ethylenic acid content is about 0.1 percent and the susceptibility increases as the amount of the ethylenic acid is increased. When the polymer composition contains at least about 0.1 percent of the ethylenic acid, satisfacotry dye susceptibility can be obtained by the processes of this invention. Ordinarily sufficient improvement in dye susceptibility can be obtained with amounts of ethylenic acid ranging up to about 10 or 15 percent although it may be advantageous to use a greater proportion of the ethylenic acid, that is, a major proportion, even approximating 100 percent, may be used when polymer compositions with ion-exchange properties are desired, except with maleic, fumaric, citraconic and mesaconic acids which do not readily form homopolymers and which should be used with at least 50 mole percent of a polymerizable monomer having a $CH_2=C<$ group. Within these proportions acrylonitrile-ethylenic acid polymer compositions when treated according to the processes of this invention show great affinity toward many dyes especially basic, acidic, vat and cellulose acetate dyes.

The acrylonitrile-ethylenic acid polymer compositions which are treated according to the processes of this invention may be either copolymers of acrylonitrile and the polymerizable ethylenic acid, with or without other copolymerizable ethylenic compounds, or mixtures of acrylonitrile polymers and polymers of polymerizable ethylenic acids. Thus suitable polymer compositions can be prepared by polymerizing a monomeric mass containing acrylonitrile and a polymerizable ethylenic acid in the proportions above specified with or without other polymerizable ethylenic compounds such as vinyl chloride, vinylidene chloride, styrene, alpha-methyl-styrene, methacrylonitrile, fumaronitrile, beta-cyano-acrylamide and others as will be mentioned hereinafter or by blending an acrylonitrile polymer with an ethylenic acid polymer. If desired, with the exception of those polymerizable ethylenic acids, such as maleic acid, which do not readily form homopolymers, an ethylenic acid homopolymer may be used although the copolymers can be blended with the acrylonitrile polymer sometimes even more readily and effectively. It is oftentimes advantageous, therefore, to prepare a copolymer of the polymerizable ethylenic acid and another polymerizable ethylenic compound, especially acrylonitrile, and to blend this copolymer with the acrylonitrile polymer in proportions to give an acrylonitrile-ethylenic acid polymer composition having the desired content of ethylenic acid. Thus, either the homopolymers or the copolymers of the ethylenic acids may be used advantageously for blending with the acrylonitrile polymer which is to be made more dye susceptible. Thus in carrying out the processes of this invention it is sometimes advantageous to prepare separate polymers, one from acrylonitrile and the other from the polymerizable ethylenic acid, to blend the two polymers, and to amidate or esterify the acid groups of the ethylenic acid polymer according to this invention. The amidation or esterification may be accomplished prior to, simultaneously with, or after the blending of the two polymers.

When it is desired to treat acrylonitrile copolymers containing in addition to the acrylonitrile structural units, structural units of one or more polymerizable ethylenic compounds, it is advantageous to form the ethylenic acid polymer by copolymerizing the polymerizable ethylenic acid with at least one of the monomers corresponding to the monomers used in preparing the acrylonitrile copolymer. Thus if the acrylonitrile polymer is a copolymer of acrylonitrile and styrene, it is desirable that the ethylenic acid polymer be a copolymer of acrylonitrile and the polymerizable ethylenic acid or of styrene and the polymerizable ethylenic acid or of acrylonitrile, styrene, and the polymerizable ethylenic acid. When the acrylonitrile polymer and the ethylenic acid polymer have common structural units they ordinarily are more compatible and may be blended together more easily.

The proportions of ethylenic acid or the corresponding amide or ester needed in the polymer used to modify an acrylonitrile polymer may vary over a wide range ranging on down from the homopolymer (100 percent ethylenic acid), or 50 mole percent where the ethylenic acid does not form homopolymers readily, to the minimum needed in the polymer composition so that dye susceptibility to acidic dyes may be imparted thereto by the processes of this invention. When the modifying polymer is a copolymer, the ethylenic acid content, etc., advantageously may range from 10 to 15 percent as a lower limit up to about 75 percent as an upper limit. This applies also to those ethylenic acids, such as maleic acid, which do not readily form homopolymers. Within this range the advantages for using a copolymer to modify the acrylonitrile polymer are more fully realized. Generally the amount of ester or amide units of the polymer molecules should represent at least about 0.1 percent of the weight of the polymer or of the polymer mixture.

The blending of a modifying polymer with an acrylonitrile polymer, as above described, may be effectively accomplished by dissolving the two polymers in a mutual solvent, mixing the polymer solution or solutions, and then removing the solvent from the resultant polymer mixture, in accordance with the usual practices in the art, such as evaporation or by addition to a precipitating bath, etc. However, if desired, the two polymers may be mixed on blending rolls, or any other effective means of blending or mixing may be used.

Very often the polymer compositions which are treated by the processes of this invention, as well as the polymer compositions resulting from said treatment, and which consist predominantly of acrylonitrile units or other units having high secondary valence bonding strength, such as the units obtained from vinylidene chloride, methacrylonitrile, fumaronitrile, and beta-acrylamide or of two or more repeating units of these types, are difficultly soluble and very efficient solvents must be used for dissolving these polymer compositions.

Suitable solvents for these polymer compositions are N,N-dimethyl acetamide (DMA), N,N-dimethyl formamide (DMF), butyrolactone, ethylene carbonate, ethylene carbamate, N,N-dimethyl methyl urethane of the formula $(CH_3)_2NCOOCH_3$, and a number of similar solvents, used alone or in conjunction with N,N-dimethyl cyanamide, N,N-dimethyl cyano-acetamide, N,N-dimethyl methoxy-acetamide, methylene dinitrile, methylene dithiocyanate, formyl caprolactam, formyl morpholine, tetramethylene sulfone, etc. Nitroalkanes, such as nitromethane, may be used as solvents for such copolymers having no more than about 85 percent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength, such as vinyl chloride, may often be dissolved in acetone or mixtures of acetone and solvents of the above types.

This invention will be more fully described by the following examples which illustrate methods of practicing the invention. In these examples and throughout the specification, "parts" and "percentages" are intended to mean parts by weight and percentages by weight.

*Example I*

Five polymers of acrylonitrile are prepared from the following monomer compositions:

| Polymer | Acrylonitrile | Maleic acid anhydride |
|---|---|---|
|  | Parts | Parts |
| A | 100 |  |
| B | 99.9 | 0.1 |
| C | 95 | 5.0 |
| D | 90 | 10.0 |
| E | 80 | 20.0 |

The 100 parts of monomer or monomer mixture is, in each case, slowly added over a period of less than an hour to 750–1000 parts of butyrolactone at 50° C. containing dissolved therein 0.15 part of benzoyl peroxide. The reaction is continued for 8–10 hours, at which time a yield of more than 90 percent polymer is obtained. The resulting polymers have molecular weights over 10,000 and a film is cast from each solution.

One part of each of the above films is refluxed separately in 50 parts of 5 percent solution of beta-aminopyridine in ethyl alcohol for one hour. A major portion of the acid anhydride groups is converted to amide groups. The films are then washed in water.

One portion of the treated films are dyed in a bath containing for each part of film 0.05 part of 1,5-diamino-4,8-dihydroxyanthraquinone-3-sulfonic acid, 0.03 part sulfuric acid and 50 parts water (50:1 bath-film ratio) at boiling temperature for one hour. The films are then removed and separately washed with water and scoured for 15 minutes in a 0.4 percent soap solution at 85° C. The films of polymers B, C, D, and E are dyed to a strong blue color whereas the film of polymer A acquires considerably less color.

A one percent by weight water solution of methylene blue dye (a basic dye) is prepared by making a paste of the dye and then diluting to the proper concentration. This dye solution is kept boiling for one hour while portions of the treated films are immersed therein for one hour. The dyed films are then removed and separately subjected to washing with boiling water for one hour, the boiling water being changed frequently to remove the desorbed dye. The unmodified polyacrylonitrile film, polymer A, shows only light coloration, whereas the maleic acid anhydride copolymers B, C, D, and E are dyed a deep and dense shade of blue. Identical films, cold-drawn and heat-treated, show dyeing characteristics similar to the undrawn films.

Fibers are spun from the same solutions either by dry spinning, or by wet spinning. The fibers are substantially freed from solvent and dried. After cold-drawing the dried fibers 600–900 percent at 120–145° C. and subsequently heat-treating them at 150° C. for one hour, the fibers are given the same treatments described above with the same results as for the films, only a light tint being acquired by the unmodified polyacrylonitrile fibers but a deep and dense color being given to polymers B, C, D, and E. The polymers of this example are also soluble in dimethyl formamide, dimethyl acetamide, ethylene carbonate, etc.

In place of maleic anhydride there can be used like amounts of itaconic and citraconic anhydrides. Polymers prepared from these anhydrides and treated as described in this example acquire coloration in the same degree as the corresponding polymers of maleic anhydride.

*Example II*

The procedure of Example I is repeated for the polymerization of the following monomer compositions:

| Polymer | Acrylonitrile | Vinyl Chloride | Itaconic acid anhydride | Copolymer Soluble in— |
|---|---|---|---|---|
|  | Parts | Parts | Parts |  |
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | NO$_2$Me. |
| E | 57 | 40 | 3 | NO$_2$Me. |
| F | 37 | 60 | 3 | Acetone. |

Sometimes copolymers D and E, when dissolved in nitromethane may have gelled, partially dissolved particles known as fisheyes. In such cases, the solubility may be improved by the addition of small amounts of materials which are good solvents for acrylonitrile polymers, such as butyrolactone, dimethyl formamide, dimethyl acetamide, ethylene carbonate, etc. In addition, certain materials which are relatively poor solvents for polyacrylonitrile, such as diethyl formamide, diethyl acetamide, diethyl propionamide, etc., may be added to improve the solubility. Also, when acetone solutions of copolymer F contain gelled particles, clarification of the solution may be effected by the addition of nitromethane, diethyl formamide, diethyl acetamide, etc.

These copolymers when amidated and dyed according to the procedures of Example I show improvements in dyeing susceptibility similar to the copolymers of Example I.

*Example III*

The procedure of Example I is repeated for the polymerization of the following monomer compositions

| Polymer | Acrylonitrile | Styrene | Maleic acid anhydride |
|---|---|---|---|
|  | Parts | Parts | Parts |
| A | 88 | 10 | 2.0 |
| B | 78 | 20 | 2.0 |
| C | 68 | 30 | 2.0 |
| D | 58 | 40 | 2.0 |

These copolymers when amidated and dyed according to the procedures of Example I show improvements in dyeing susceptibility similar to those of Example I. In place of styrene, various styrene derivatives may be used, such as alpha-methyl-styrene; nuclear-substituted chloro-styrenes, i. e., ortho-, meta-, and para-chloro-styrenes, dichloro-styrenes, for example the 2,3- 2,4-, 2,5-, 2,6-, 3,4-, and 3,5-dichloro-styrenes, trichloro-styrenes; cyano-styrenes, such as ortho-, meta-, and para-cyano-styrenes, dicyano-styrenes; nuclear-substituted alkyl-styrenes, such as mono- and dimethyl-styrenes, mono- and di-isopropyl-styrenes; aryl-substituted styrenes, i. e., para-phenyl-styrene, etc.; cycloaliphatic-substituted styrenes, such as para-cyclohexyl-styrene; fluoro-styrenes, such as ortho-, meta-, para-fluoro-styrene, difluoro-styrenes, etc.; trifluoro-methyl-styrenes, such as ortho-, meta-, and para-trifluoromethyl-styrenes, di - (trifluoromethyl) - styrenes; and various other styrenes or mixtures of any number of these with each other or with styrene.

Example IV

The procedure of Example I is repeated for the polymerization of the following monomer compositions:

| Polymer | Acrylonitrile | Vinylidene Chloride | Maleic Acid Anhydride | Copolymer Soluble in— |
|---|---|---|---|---|
| | Parts | Parts | Parts | Parts |
| A | 85 | 10 | 5 | DMF, DMA, etc. |
| B | 65 | 30 | 5 | DMF, DMA, etc. |
| C | 45 | 50 | 5 | DMF, DMA, etc. |
| D | 25 | 70 | 5 | DMF, DMA, etc. |
| E | 5 | 90 | 5 | DMF, DMA, etc. |

With the above vinylidene chloride copolymers and similar copolymers having a total of acrylonitrile and vinylidene chloride of at least 85 percent in the polymer molecules, only the more active solvents, such as butyrolactone, N,N-dimethyl acetamide, N,N-dimethyl formamide, ethylene carbonate, etc., can be used as solvents.

These copolymers when amidated and dyed according to the procedures of Example I show improvements in dyeing susceptibility similar to those of Example I.

Example V

The procedure of Example I is repeated for the polymerization of the following monomer compositions:

| Polymer | Acrylonitrile | Vinylidene Chloride | Vinyl Chloride | Itaconic Acid Anhydride |
|---|---|---|---|---|
| | Parts | Parts | Parts | Parts |
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

These copolymers when amidated and dyed according to the procedures of Example I show improvements in dyeing susceptibility similar to those of Example I.

Example VI

To a 25 percent dimethyl formamide solution of a copolymer of 95 percent acrylonitrile and 5 percent maleic anhydride (polymer C of Example I) there are added 4.5 parts of a mixture of alpha- and beta-aminopyridine in 25 parts dimethyl formamide and the mixture held at 130° C. for one hour and the solution filtered and dry spun into fibers and dyed with 1,5-diamino-4,8-dihydroxyanthraquinone-3-sulfonic acid as in Example I to a strong blue shade. Satisfactorily dyed shaped articles are similarly obtained with the polymer B of Example II, polymer C of Examples III and IV, and polymer A of Example V.

Example VII

Five parts of the undyed copolymer fiber of Example VI are dyed to a deep green shade using the vat color dimethoxy-dibenzanthrone at 70° C. in a bath containing 0.5 part of dye, 0.25 part sodium hydroxide, 0.5 part sodium hydrosulfite and 100 parts of water (20:1 bath-fiber ratio). After the first 15 minutes of heating, 0.25 part of Glauber's salt are added. The sample is then oxidized in a 0.5 percent sodium dichromate-1.0 percent acetic acid aqueous solution at 70° C. for 30 minutes in a 20:1 bath-fiber ratio. The dyed fiber is then scoured in a 0.5 percent boiling soap solution. A sample of yarn prepared from the unmodified acrylonitrile-maleic anhydride copolymer and dyed under the same conditions acquires only a light shade of color.

Example VIII

To a 20 percent butyrolactone solution containing 750 parts of polyacrylonitrile (polymer A of Example I) there is added 45 parts of a mixture of alpha- and beta-aminopyridine and a butyrolactone solution containing 250 parts of polymer E of Example I. The solution is held at 130° C. for one hour and filtered. From the solution thus obtained there is cast a film of a polymer mixture (95 percent acrylonitrile units and 5 percent maleic anhydride units) having a dye susceptibility similar to polymer C of Example I.

Example IX

The procedure of Example VIII is followed except that instead of using a butyrolactone solution of polymer E of Example I, there is used a butyrolacetone solution containing 100 parts of a copolymer prepared according to Example I from equal parts of acrylonitrile and maleic anhydride. The film cast from this solution is a polymer mixture (90 percent acrylonitrile units and 5 percent maleic anhydride units) having a dye susceptibility similar to polymer C of Example I.

Example X

Itaconic acid anhydride is polymerized by the procedure of Example I to form the homo-polymer of itaconic anhydride in solution in butyrolactone. To this solution is added 4.5 parts of a mixture of alpha- and beta-aminopyridines for every 5 parts of polyitaconic anhydride and the solution is heated to 130° C. for one hour. There is thus obtained a solution of the homo-polymer of itaconic anhydride in which a major proportion of the acid anhydride groups are converted to amide groups by the aminopyridine. If desired, the amidated homo-polymer may be recovered from this solution.

To the solution of the amidated homo-polymer of itaconic anhydride thus prepared is added a 20 percent solution of polyacrylonitrile (polymer A of Example I) in an amount to give 95 parts of polyacrylonitrile for each 5 parts of poly-itaconic anhydride and the solution is heated to 130° C. and filtered. Films and fibers cast from this solution as in Example I show dye susceptibility similar to that of the amidated polymer C of Example I.

Example XI

To a 20 percent butyrolactone solution containing 900 parts of a copolymer of 90 percent acrylonitrile and 10 percent styrene, prepared by the procedure of Example I, there is added 45 parts of a mixture of alpha- and beta-aminopyridines and a butyrolactone solution prepared according to Example I by copolymerizing 45 parts acrylonitrile, 5 parts styrene and 50 parts maleic anhydride. The solution is heated at 130° C. for one hour and filtered. Films and fibers prepared from this solution have a dye susceptibility similar to that of amidated polymer A of Example III.

While in the foregoing examples the processes of the invention have been illustrated with reference to 2-aminopyridine and a mixture of alpha- and beta-amino-pyridines which are the most readily available and most economical of the amino pyridines, satisfactorily dyed products are also obtained by using the other amino pyridines described above. These other amino pyridines may be used on an equivalent weight basis in the processes of the foregoing examples in lieu of the amino pyridines there set forth.

Example XII

The procedure of Example I is repeated using 4-amino-2,6-dimethyl pyrimidine in place of the 2-amino pyridine. There is obtained in this manner copolymer films and fibers which show dye susceptibility similar to the copolymer films and fibers of Example I. 4-amino-2,6-dimethyl pyrimidine similarly may be used in place of 2-amino pyridine in the processes of Examples II through XI.

While the invention is illustrated in the above examples by 4-amino-2,6-dimethyl pyrimidine which is readily and economically available, being obtainable from acrylonitrile, the invention may be practiced with any of the other amino pyrimidines described and satisfactorily dyed products obtained.

Example XIII

The procedure of Example I is repeated using para-amino-dimethyl aniline in place of the 2-amino pyridine. There is obtained in this manner copolymer films and fibers which show dye susceptibility similar to the copolymer films and fibers of Example I. Para-amino-dimethyl aniline similarly may be used in place of 2-amino pyridine in the processes of Examples II through XI.

While the invention is illustrated in the above example by para-amino dimethyl aniline which is readily and economically available, the invention may be practiced with any of the other amino-N,N-dialkylanilines described and satisfactorily dyed products obtained.

Example XIV

The procedure of Example I is repeated using guanazole in place of the 2-amino pyridine. There is obtained in this manner copolymer films and fibers which show dye susceptibility similar to the copolymer films and fibers of Example I. Guanazole similarly may be used in place of 2-amino pyridine in the processes of Examples II through XI.

While the invention is illustrated in the above example by guanazole which is readily and economically available, the invention may be practiced with any of the other diamino-1,2,4-triazoles described and satisfactorily dyed products obtained.

Example XV

Five polymers of acrylonitrile are prepared from the following monomer compositions:

| Polymer | Acrylonitrile | Acrylic Acid |
|---|---|---|
|  | Parts | Parts |
| A | 100 |  |
| B | 99.9 | 0.1 |
| C | 95 | 5.0 |
| D | 90 | 10.0 |
| E | 80 | 20.0 |

To 900 parts of water, adjusted to a pH of about three, in a suitable reactor, is added 1.0 part of ammonium persulfate, 0.5 part of sodium bisulfite, and 100 parts of monomer or monomer mixture. The reactor is flushed with deoxygenated nitrogen and heated with agitation to 50° C. for 24 hours. Steam is then introduced into the reactor to remove unpolymerized monomers from the mixture. A small amount of aluminum sulfate is added to the mixture and the polymer isolated by filtration and then washed with water and with methyl alcohol.

The polymer is then refluxed with an excess of thionyl chloride to convert the acid groups to acid chloride groups and thereafter reacted with a mixture of alpha- and beta-amino pyridines to form the pyridyl amide. The amidation is effected by dissolving 5 parts of the polymer and 4.5 parts of a mixture of alpha- and beta-amino pyridine in butyrolactone and heating the solution at 130° C. for one hour. Films and fibers cast from this solution show dye susceptibility similar to the treated copolymers of Example I.

In place of acrylic acid in the above example there may be used methacrylic acid, cyano-acrylic acid, fumaric acid or mesaconic acid. These acids also may be utilized in place of the maleic and itaconic anhydrides in forming copolymers containing monomers other than the acrylonitrile and the ethylenic acid such as are illustrated in Examples II, III, IV, and V. The procedure of this example also is effective for producing useful, dyeable polymer compositions with other amino tertiary nitrogenous bases as set forth generally above and in particular in Examples XII, XIII, and XIV. Homopolymers of acrylic and methacrylic acids may be amidated and blended with acrylonitrile or acrylonitrile copolymers using the amidation procedure of this example and the blending procedures of Examples VIII, IX, X, and XI.

While the invention has been illustrated particularly with reference to amidation processes in which the acid groups of the polymer composition are amidated with an amino tertiary nitrogenous base, since this procedure yields products which are more stable, and less susceptible to hydrolysis, nevertheless the procedures of the foregoing examples may also be applied to esterification processes in which the acid groups of the polymer composition are esterified with a hydroxy tertiary nitrogenous base, suitable examples of which are given above. For example, the procedure of Example VI can be followed using 4-hydroxy pyrimidine, etc., in place of the amino pyridine to give fibers of similarly improved dyeing properties.

As previously indicated, the solvent resistance of such polymer compositions as contain one or more monomer units in addition to those formed by the acrylonitrile and the polymerizable ethylenic acid is affected by the type and proportion of copolymerizing monomer or monomers used to replace part of the acrylonitrile. For example, copolymers containing small amounts, say up to about 15 percent, of polymerizable ethylenic acid units may contain various proportions of such monomer units as are obtained from vinylidene chloride, methacrylonitrile, fumaronitrile, and beta-cyano-acrylamide without considerable reduction in solvent resistance. Replacement of acrylonitrile units in the copolymers by vinyl chloride, styrene and alpha-methyl-styrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile-itaconic acid anhydride copolymer will be decreased much more when a monomer having relatively weak secondary bonding forces, such as styrene or ethylene is used to replace part of the acrylonitrile than when one or more monomers having relatively strong bonding forces, such as methacrylonitrile, fumaronitrile, beta-cyano-acrylamide, methyl beta-cyano-acrylate and vinylidene chloride, is used to replace part of the acrylonitrile. Furthermore, the ability of these copolymers to form molecularly oriented shaped articles also depends on the type and amount of the copolymerizing monomer or monomers used to replace acrylonitrile.

Other copolymerizable ethylenic compounds which may also be used in forming polymer compositions which can be treated by the processes of this invention include one or more of the following: acrylates, e. g., methyl acrylate; methacrylates, e. g., methyl methacrylate; acrylamides, methacrylamides; vinyl esters, such as vinyl acetate; itaconic diesters, such as dimethyl and diethyl itaconates; itaconamide; vinyl halides, such as vinyl fluoride, vinylidene fluoride, tetrafluoroethylene, trifluorochloroethylene; vinyl aryls, such as vinyl naphthalenes, and substituted styrenes as listed in Example III, etc.

The polymer compositions of this invention may be prepared by various polymerization systems, such as emulsion, suspension, mass and solution polymerizations. In addition to the monomers, the polymerizable mass may also contain other materials such as catalysts, e. g., peroxides, such as benzoyl peroxide, naphthyl peroxides, phthalyl peroxide, tertiarybutyl hydroperoxide, hydrogen peroxide, cyclohexyl hydroperoxide, tertiarybutyl perbenzoate, etc., azo compounds, persulfates, such as ammonium persulfate, etc., solvents, suspension or emulsion media, emulsifying agents, suspension agents, plasticizers, lubricants, etc.

For use in the preparation of shaped articles, the polymer compositions of this invention have molecular weights preferably of at least about 10,000. However, polymer compositions of molecular weights less than 10,000 may be used for other purposes, such as impregnants, solvent resistant coatings, etc. The molecular weight of the polymer compositions is dependent on the concentrations of the monomers, the amount and type of catalyst, the temperature of reaction, etc.

As is quite generally known in the field of high polymers, molecular orientation is usually indicated and identified by birefrigence of polarized light, under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers may be made from the solutions of the untreated or treated polymer compositions of this invention by dry spinning, as in the preparation of cellulose acetate fibers, or by wet spinning, as in the preparation of viscose rayon. In wet spinning, the solution of polymer compositions may be spun into a substance which is a non-solvent for the polymer compositions, but which is advantageously compatible with the solvent in which the polymer compositions are dissolved. For example, water, acetone, methyl alcohol, carbon disulfide, glycerine, chloroform, carbon tetrachloride, benzene, etc., may be used as precipitating bath for N,N-dimethyl acetamide and other solvent compositions of these polymer compositions. The extruded fibers, from which substantially all of the solvent has been removed in the spinning step, about 1–10 percent remaining in the shaped article, may then be cold-drawn about 100–900 percent, preferably about 300–600 percent; and the drawn fiber heat-treated, usually at substantially constant length, at about 100–160° C. to effect further crystallization and removal of the remaining solvent. The term "heat-treated," as used herein, refers to the application of heat to an object, usually at a controlled temperature and usually by means of the medium surrounding the object.

Many of the acrylonitrile polymer compositions of this invention may be molecularly oriented, especially if there is no more than 15 percent ethylenic acid in the polymer composition. This is true when the major portion of the polymer compositions is acrylonitrile, for example, 85 percent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and the polymerizable ethylenic acid, the proportion of acrylonitrile in the polymer compositions may be much less than 85 percent without destroying the capacity for molecular orientation. Molecularly oriented, cold-drawn, shaped articles of particular usefulness such as fibers and films are prepared from copolymer compositions containing in the polymer molecules 60–99.9 percent acrylonitrile, 0.1–15 percent, advantageously, 0.1–5 percent polymerizable ethylenic acid, or 0.1–15 percent of the resultant amide or ester, with or without one or more monomers of the class consisting of vinylidene chloride, vinyl chloride, styrene, alpha-methyl-styrene, methacrylonitrile, fumaronitrile, beta-cyano-acrylamide and methyl beta-cyano-acrylate, the effects of the presence of the monomers of this class being noticeable when the monomer is present in the polymer compositions in amounts of 1 percent or more.

The basic dyestuffs toward which these polymer compositions show great affinity are preferably those which contain amido, alkylamido, or ammonium groups, such as

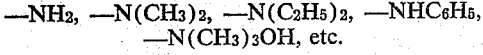

and which may also be used in the form of their salts, i. e., the hydrochlorides, sulfates or oxalates. Some of these basic dyes are Methylene Blue, Rhodamine B, Indamine Blue, Auramine, Meldola's Blue, Chrysoidine Y, Acridine Yellow, Magenta, Crystal Violet, Thioflavine T. Saffranine and Bismarck Brown. The cellulose acetate dyes which are effective with these polymer compositions are mainly amino-anthraquinone derivatives, basic azo compounds and other basic substances, such as the Duranol, Dispersol, Sericol, etc. dyestuffs. A number of other acidic dyes that can be used are anthranilic acid→ 1-(4'-sulfophenyl)-3-methyl-5-pyrazolone; 1,5-diamino-4,8-dihydroxy-anthraquinone-3-sulfonic acid; 1-aminonaphthalene-4-sulfonic acid→alpha-naphthol-4-sulfonic acid; the sodium salt of sulfanilic acid→aniline→2 - benzoylamino - 5 - naphthol-7-sulfonic acid; the sodium salt of 4,4'-diaminostilbene-2,2'-disulfonic acid ⇌ (phenol)₂ ethylated; 1,5-diamino-4,8-dihydroxy-anthraquinone-3-sulfonic acid; dye prepared by diazotizing 1 - aminonaphthalene - 4 - sulfonic acid and coupled with alpha-naphthol-4-sulfonic acid; the sodium salt of (m-aminobenzoic acid→o-anisidine) phosgenated; the sodium salt of (2-naphthol-6,8-disulfonic acid←benzidine→phenol) ethylated; dimethoxy-dibenzanthrone; and 1,5-di-p-anisoylamino-4,8-dihydroxyanthraquinone.

From the molecularly orientable polymer compositions of this invention fibers may be prepared having improved dyeing properties, low shrinkage in boiling water, sometimes as low as 3 to 5 percent or less of the cold-drawn or stretched article, good heat resistance, and tensile strength in the order of 4 to 6 grams per denier. Moreover, these properties make the fibers desirable in the manufacture of hoisery and for such all-purpose fabrics as used for blouses, shirts, suit, etc.

I claim:

1. A process for preparing acrylonitrile polymeric compositions having affinity for acid dyes which comprises preparing a polymeric composition containing in polymer form a plurality of units of the formula

and a plurality of polymer units derived from a polymerizable ethylenic acid selected from the class consisting of acrylic, methacrylic, beta-cyanoacrylic, maleic, fumaric, citraconic, mesaconic, and itaconic acids and the inner acid anhydride of maleic, citraconic, and itaconic acids, and reacting at least some of the acid groups of the polymerized ethylenic acid with a monomeric nitrogen compound selected from the class consisting of amino and hydroxy pyridines, amino and hydroxy pyrimidines, amino and hydroxy N,N-dialkyl anilines, and diamino-1,2,4-triazoles, whereby said compound becomes attached to the polymeric ethylenic acid through a linkage of the class consisting of amide and ester linkages.

2. The process of claim 1 in which the polymeric acrylonitrile and the polymeric ethylenic acid are contained in the same polymer.

3. The process of claim 1 in which the polymeric composition comprises a copolymer of acrylonitrile, a polymerizable ethylenic acid, and a monomer selected from the class consisting of vinyl chloride, vinylidene chloride, styrene, alpha-methyl-styrene, methacrylonitrile, fumaronitrile, beta-cyano-acrylamide, and methyl-beta-cyano-acrylate.

4. The process of claim 1 in which the polymeric composition is prepared by blending an acrylonitrile polymer and a polymer of the ethylenic acid.

5. The process of claim 4 in which the acrylonitrile polymer and the ethylenic acid polymer contain common structural units.

6. The process of claim 5 in which the common structural units are obtained from a monomer selected from the class consisting of acrylonitrile, vinyl chloride, vinylidene chloride, styrene, alpha-methyl-styrene, methacrylonitrile, fumaronitrile, beta-cyano-acrylamide, and methyl beta-cyanoacrylate.

7. The process of claim 1 in which the nitrogen compound is an amino pyridine.

8. The process of claim 1 in which the nitrogen compound is an amino pyrimidine.

9. The process of claim 1 in which the nitrogen compound is an amino N,N-dialkyl aniline.

10. The process of claim 1 in which the nitrogen compound is an amino N,N-dimethyl aniline.

11. The process of claim 1 in which the nitrogen compound is guanazole.

12. The process of claim 1 in which the polymerizable acid is acrylic acid.

13. The process of claim 1 in which the polymerizable acid is methacrylic acid.

14. The process of claim 1 in which the polymerizable acid is cyano-acrylic acid.

15. The process of claim 1 in which the polymerizable acid is an inner acid anhydride.

16. The process of claim 15 in which the inner anhydride is maleic anhydride.

17. The process of claim 15 in which the inner anhydride is itaconic anhydride.

18. A polymeric composition comprising polymeric acrylonitrile and a polymeric ethylenic acid of a polymerizable acid of the class consisting of acrylic, methacrylic, beta-cyanoacrylic and in which part of the carboxyl groups of the polymeric ethylenic acid are attached by linkages of the class consisting of amide and ester linkages to radicals derived from a monomeric nitrogen compound of the class consisting of amino and hydroxy pyridine, amino and hydroxy pyrimidines, amino and hydroxy N,N-dialkyl anilines and diamino-1,2,4-triazoles.

19. The composition of claim 18 in which the nitrogen-containing polymeric acid portion of the composition represents 0.1 to 15 percent of the total weight of the polymer content of the composition.

20. The composition of claim 18 in which the amount of polymeric acrylonitrile is at least 85 percent by weight of the polymer content.

21. The composition of claim 18 in which the polymer composition is derived from a copolymer of acrylonitrile and the polymerizable ethylenic acid.

22. The composition of claim 21 in which the copolymer is obtained from acrylonitrile, a polymerizable ethylenic acid of the class listed in claim 18 and at least one other monomer selected from the class consisting of vinyl chloride, vinylidene chloride, styrene, alpha-methyl-styrene, methacrylonitrile, fumaronitrile, beta-cyano-acrylamide, and methyl beta-cyano-acrylate.

23. The composition of claim 18 in which the polymer composition is obtained by blending an acrylonitrile polymer and an ethylenic acid polymer.

24. The composition of claim 23 in which the acrylonitrile polymer and the ethylenic acid polymer contain common structural units.

25. The composition of claim 34 in which the common structural units are obtained from a monomer selected from the class consisting of acrylonitrile, vinyl chloride, vinylidene chloride, styrene, alpha-methyl-styrene, methacrylonitrile, fumaronitrile, beta-cyano-acrylamide, and methyl beta-cyano-acrylate.

26. The composition of claim 24 in which the common structural units are obtained from acrylonitrile.

27. A composition of matter according to claim 18 in which the polymerizable ethylenic acid is acrylic acid.

28. A composition of matter according to claim 18 in which the polymerizable ethylenic acid is methacrylic acid.

29. A composition of matter according to claim 18 in which the polymerizable ethylenic acid is cyano-acrylic acid.

30. A cold drawn fiber having molecular orientation, said fiber comprising a polymer composition obtained from about 60–98.9 percent acrylonitrile, about 0.1 to 5 percent of a polymerizable ethylenic acid and 1–39.9 percent of a compound selected from the class consisting of vinyl chloride, vinylidene chloride, styrene, alpha-methyl-styrene, methacrylonitrile, fumaronitrile, beta-cyano-acrylamide, and methyl-beta-cyano-acrylate, in which part of the carboxylic groups of the ethylenic acid portion of part of the carboxylic groups of the polymer has attached thereto through a linkage selected from the class consisting of amide and ester linkages a monomeric nitrogen compound selected from the class consisting of amino-pyridines, aminopyrimidines, amino-N,N-dialkylanilines, and diamino-1,2,4-triazoles and the polymerizable ethylenic acid is selected from the class consisting of acrylic, methacrylic, cyano-acrylic.

References Cited in the file of this patent

UNITED STATES PATENTS

| | | |
|---|---|---|
| 2,512,628 | Fisher et al. | June 27, 1950 |
| 2,531,408 | D'Alelio | Nov. 28, 1950 |
| 2,687,400 | D'Alelio | Aug. 24, 1954 |
| 2,687,401 | D'Alelio | Aug. 24, 1954 |